United States Patent [19]

Biale

[11] Patent Number: 5,185,397
[45] Date of Patent: Feb. 9, 1993

[54] WATER-BASED VARNISHES

[75] Inventor: John Biale, Anaheim, Calif.

[73] Assignee: Rohm and Haas Company, Philadelphia, Pa.

[21] Appl. No.: 396,854

[22] Filed: Aug. 21, 1989

[51] Int. Cl.$^5$ ............................................. C08L 33/00
[52] U.S. Cl. ................................... 524/820; 524/821; 524/828; 524/831; 524/832
[58] Field of Search ............... 524/560, 820, 821, 828, 524/831, 832

[56] References Cited

U.S. PATENT DOCUMENTS

| | | | |
|---|---|---|---|
| 3,634,298 | 1/1972 | Wamsley et al. | 260/29.6 |
| 4,025,037 | 5/1977 | Shibayama et al. | 228/214 |
| 4,153,592 | 5/1979 | Burroway et al. | 526/329.6 |
| 4,617,230 | 10/1986 | Shah et al. | 428/290 |
| 4,713,412 | 12/1987 | Czerepinski et al. | 524/833 |

FOREIGN PATENT DOCUMENTS

| | | |
|---|---|---|
| 0269059 | 6/1988 | European Pat. Off. . |
| 3418524 | 11/1985 | Fed. Rep. of Germany . |
| 59-075959 | 4/1984 | Japan . |

OTHER PUBLICATIONS

Dialog Information Services, File 351, World Patent Index 81-90, Dialog accession No. 86-017886/03.
Dialog Information Services, File 350, World Patent Index 63-80, Dialog accession No. 80-595510/34.
Dialog Information Services, File 351, World Patent Index 81-90, Dialog accession No. 82-36474E/18.
Dialog Information Services, File 351, World Patent Index 81-90, Dialog accession No. 84-143597/23.

*Primary Examiner*—Melvyn I. Marquis
*Assistant Examiner*—Mark Sweet
*Attorney, Agent, or Firm*—James G. Vouros

[57] ABSTRACT

A polymeric emulsion comprising a (i) polymer, (ii) water, and (iii) a surfactant is useful as a binder for a water-based varnish that is resistant to water, 50% ethanol, and alkali. The polymer comprises about 20 to about 40 weight percent of a soft monomer whose homopolymer has a $T_g$ of less than about $-20°$ C. and about 60 to about 80 weight percent of a mixture of hard monomers each of whose homopolymer has a $T_g$ of greater than about 30° C. As part of the hard monomer comonent of the polymer, the polymer comprises about 5 to about 25 weight percent acrylonitrile and about 1 to about 5 weight percent of an olefinic carboxylic acid. Typically, the polymer comprises less than about 1 weight percent surfactant and has a calculated $T_g$ of about 25° to about 60° C., an actual $T_g$ of about 30° to about 70° C., and an average particle size of less than about 250 nm. The emulsion generally comprises at least about 40 weight percent solids and has a surface tension of at least about 45 dynes/cm.

24 Claims, No Drawings

WATER-BASED VARNISHES

BACKGROUND

The present invention relates to polymeric emulsions and to varnishes.

Due to increasingly more stringent regulations limiting the volatile organic content (VOC) of coatings, e.g., paints and varnishes, and the ease of handling water-based materials, the coating industry is continuously reformulating solvent-based coatings to meet VOC specifications and, wherever possible, replacing solvent-based products with water-based materials.

However, varnishes, which are required to possess block resistance, good gloss, and exceptional resistance to (a) water, (b) 50 weight percent (wt %) aqueous ethanol solution, and (c) mild alkali, e.g., 1 wt % aqueous trisodium polyphosphate (TSP) solution, have remained predominantly the exclusive area of solvent-based formulations.

SUMMARY OF THE INVENTION

The present invention provides water-based polymeric emulsions that are useful as a binder for water-based varnishes. The water-based varnishes exhibit block resistance, good gloss, and exceptional resistance to (a) water, (b) 50 wt % ethanol, and (c) mild alkali. The polymeric emulsions contain at least about 40 percent solids and comprise a (i) a polymer, (ii) water, and (iii) a surfactant-containing locus for polymerization. Usually, the emulsion comprises less than about 1 weight percent surfactant based on the total monomer weight in the polymer. The polymer comprises about 20 to about 40 weight percent soft monomer and about 60 to about 80 weight percent hard monomer. A portion of the hard monomer component of the polymer is composed of acrylonitrile and an olefinic carboxylic acid monomer. Typically, the polymer comprises about 2 to about 20 weight percent acrylonitrile and about 1 to about 5 weight percent olefinic carboxylic acid monomer. As used in the specification and claims, the term "soft monomer" means a monomer whose homopolymer has a $T_g$ of less than about $-20°$ C.; the term "hard monomer" means a monomer whose homopolymer has a $T_g$ of greater than about $30°$ C.; and the terms "weight percent hard monomer," "weight percent soft monomer," "weight percent olefinic carboxylic acid monomer," and "weight percent acrylonitrile" each mean the total dry weight of the respective constituent ingredient employed in making the polymer divided by the total weight of the monomers employed in making the polymer, this quotient being multiplied by 100%. Generally, the emulsions have a surface tension of at least about 45 dynes/cm and the polymers have an average particle size of less than 250 nm. When the emulsion is employed as the binder component of a varnish, the resulting water-based varnish, when applied to a surface and dried, forms a film that is resistant to, inter alia, water, 50% ethanol, and alkali.

DETAILED DESCRIPTION OF THE INVENTION

In accordance with the present invention, each polymeric emulsion comprises a (i) polymer, (ii) water, and (iii) a surfactant-containing locus for polymerization. Generally, the emulsion comprises less than about 1 weight percent surfactant. As used in the specification and the claims, "weight percent surfactant" is defined as the total dry weight of the surfactant(s) employed in making the polymer divided by the total weight of the monomers employed in making the polymer, this quotient being multiplied by 100%. Preferably the emulsion comprises less than about 0.5 weight percent surfactant.

In general, when all other parameters are held constant, the lower the surfactant content of the polymer, the more insensitive the polymer is to water and the higher the surface tension of the emulsion. Typically, the emulsion has a surface tension of at least about 45 dynes/cm, and preferably about 45 to about 65 dynes/cm.

The surfactant is normally a copolymerizable surfactant, an anionic surfactant, a nonionic surfactant, or a mixture of two or more of these surfactants. Exemplary copolymerizable surfactants include, but are not limited to, sulfoethylmethacrylate, vinylsulfonate salts, sulfopropylmethacrylate, styrene sulfonate salts, 2-acrylamido-2-methylpropanesulfonic acid salts, and mixtures thereof. Anionic surfactants include, but are not limited to, alkylphenolethoxylate sulfates and sulfonates, alkylsulfates and sulfonates, and mixtures thereof. Nonionic surfactants include, but are not limited to, alkylarylpolyether alcohols, alkylphenolethoxylates, alkylethoxylates, ethyleneoxide/propylene oxide block copolymers, and mixtures thereof.

The polymer generally comprises about 20 to about 40 weight percent of a soft monomer and about 60 to about 80 weight percent of a plurality of hard monomers. Preferably, the polymer comprises about 25 to about 35 weight percent soft monomer and about 65 to about 75 weight percent hard monomer. The soft and hard monomers together typically constitute at least about 95 weight percent of the polymer, and preferably at least about 98 weight percent of the polymer.

The soft monomer, which is a monomer whose homopolymer has a $T_g$ of less than about $-20°$ C., is typically selected from the group consisting of non-functional acrylic monomers, ethylene, and mixtures thereof. As used in the specification and claims, the term "non-functional monomer" means a monomer that is devoid of any group, e.g., hydroxyl, carboxyl, amide, and amine, that can undergo further reaction after polymerization of the monomer. Non-functional acrylic monomers are the preferred soft monomers.

The non-functional acrylic monomers have the formula I

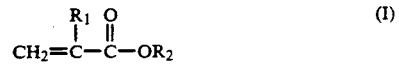

wherein $R_1$ is selected from the group consisting of hydrogen and methyl, and $R_2$ is an alkyl group, preferably having up to about 15 carbon atoms. As used in the specification and claims, the term "alkyl" means cyclic and acyclic saturated hydrocarbon groups that can be either branched or unbranched. Exemplary soft, non-functional acrylic monomers include, but are not limited to, butyl acrylate, isobutyl acrylate, ethylhexyl acrylate, isodecyl methacrylate, lauryl methacrylate, tridecylmethacrylate. 2-ethylhexyl acrylate is the preferred soft, non-functional monomer.

With respect to the hard monomer (whose homopolymer has a $T_g$ of greater than about $30°$ C.), hard monomers include, but are not limited to, vinyl halides, acrylonitrile, methacrylamide, alkylene aromatic monomers and non-functional methacrylic monomers. As used in the specification and claims, "alkenyl aromatic monomers" are defined as any organic compound containing at least one aromatic ring and at least one aliphatic-containing moiety having alkenyl unsaturation. Preferred alkenyl aromatic monomers are represented by the formula II

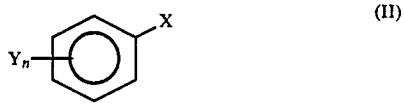
(II)

wherein X is an aliphatic radical containing at least one alkenyl bond, Y is a substituent on the aromatic ring, and n is the number of Y substituents on the ring, n being an integer from 0 to 5. Generally, X comprises at least 2 carbon atoms, but usually no more than about 6, and preferably no more than about 3 carbon atoms. X is preferably a substituted or unsubstituted alkenyl group. Preferred substituents on the alkenyl group are halogen radicals, e.g., chloride. However, the most preferred alkenyl group is unsubstituted, i.e., a hydrocarbon, and contains only one olefinic unsaturation. Ethylene is the most preferred X.

Y is an organic or inorganic radical. As used throughout the specification and claims, the term "organic radical" means any group containing at least one carbon atom, and the term "inorganic radical" means any group devoid of carbon atoms. When n is 2 or more, Y can be the same or different. If organic, Y generally contains from 1 to about 15 carbon atoms and, preferably, is an aliphatic radical. Even more preferably, Y is a saturated aliphatic radical. If inorganic, Y is preferably a halogen. Exemplary Y substituents include halo and cyano radicals and substituted and unsubstituted alkyl radicals of 1 to about 10 carbon atoms. Preferred Y substituents are chloride and unsubstituted alkyl groups of 1 to about 6 carbon atoms. Y is more preferably a chloride radical and $C_1$ to about $C_4$ unsubstituted alkyl radicals.

Illustrative alkenyl aromatic monomers include styrene, p-methyl styrene, methyl styrene, o,p-dimethyl styrene, o,p-diethyl styrene, p-chlorostyrene, isopropyl styrene, t-butyl styrene, o-methyl-p-isopropyl styrene, o,p-dichlorostyrene, and mixture thereof. Due to its commercial availability and low cost, styrene is the preferred alkenyl aromatic monomers.

With respect to non-functional methacrylic monomers, exemplary non-functional methacrylic monomers have the formula III

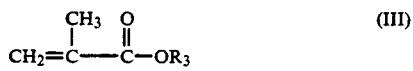
(III)

wherein $R_3$ is an alkyl group that preferably contains up to about 6 carbon atoms. Typical non-functional methacrylic monomers include methyl methacrylate, ethyl methacrylate, isobutyl methacrylate, isobornyl methacrylate, and mixtures thereof.

The halide moiety of the vinyl halide monomers is preferably either chloride or bromide, with chloride being the most preferred halide moiety.

An important aspect of the present invention is that acrylonitrile and one or more olefinic carboxylic acid monomers constitute a portion of the hard monomer portion of the polymer. Typically, the polymer comprises about 5 to about 20 weight percent acrylonitrile and about 1 to about 5 weight percent olefinic carboxylic acid. Preferably, the polymer comprises about 8 to about 15 weight percent acrylonitrile and about 2 to about 4 weight percent olefinic carboxylic acid.

Olefinic carboxylic acid monomers include both mono-olefinic carboxylic acid monomers and di-olefinic carboxylic acid monomers. Exemplary mono-olefinic carboxylic acids include, but are not limited to, acrylic acid, methacrylic acid, and acrylamido glycolic acid. An exemplary di-olefinic carboxylic acid is itaconic acid. The preferred olefinic carboxylic acid monomer is methacrylic acid. However, mixtures of olefinic carboxylic acids can also be used.

The polymer optionally comprises a cross-linking agent. Typical cross-linking agents include, but are not limited to, N-methylol acrylamide, N-methylol methacrylamide, diacrylates, dimethacrylates, triallyl cyanurate, diallyl maleate, methyl acrylamidoglycolate methyl ether, olefinically unsaturated monomers having the formula IV

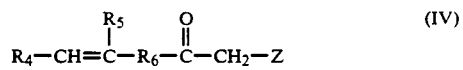
(IV)

and mixtures thereof, wherein $R_4$ is selected from the group consisting of hydrogen and halogen, $R_5$ is selected from the group consisting of hydrogen, halo, thio, and monovalent organic radicals, $R_6$ is a divalent radical, and Z is selected from the group consisting of organoacyl and cyano. Preferably, $R_4$ is hydrogen, $R_5$ is hydrogen or an alkyl radical having up to about 10 carbon atoms, $R_6$ is a cyclic or acyclic organic radical containing up to about 40 carbon atoms, and Z is an organoacyl having the formula V

(V)

wherein $R_7$ is selected from the group consisting of hydrogen and monovalent organic radicals. More preferably, $R_6$ is an acyclic radical containing up to about 20 atoms in length, with any and all side groups each being up to about 6 atoms in length, and $R_7$ is hydrogen or an alkyl group containing up to about 7 carbon atoms. $R_6$ is most preferably an alkylene group containing up to about 10 carbon atoms, and $R_7$ is most preferably methyl. Due to its commercial availability, the preferred cross-linking agent of formula IV is acetoacetoxyethyl methacrylate. However, the most preferred cross-linking agent is N-methylol acrylamide.

When employed, the polymer generally contains about 0.2 to about 5 weight percent cross-linking agent, but preferably about 1 to about 3 weight percent cross-linking agent. As used in the specification and claims, the term "weight percent cross-linking agent" means the total dry weight of the cross-linking agent employed in making the polymer divided by the total weight of the monomers employed in making the polymer, this quotient being multiplied by 100%.

The polymer preferably has an average particle size (i.e., an average maximum cross-sectional dimension) of less than about 250 nm. In general, for the polymer of the invention, the smaller the average particle size, the more water-resistant the polymer. Accordingly, it is preferred that the average particle size of the polymer be from about 85 to about 200 nm, more preferably from about 90 to about 190 nm, and most preferably from about 100 to about 150 nm.

The polymeric emulsion optionally comprises one or more other ingredients. For example, the polymer can comprise one or more ureido-containing monomers. Exemplary ureido-containing monomers include, but are not limited to, 2-ureido-ethyl acrylate, 2-ureido-methyl acrylate, 2-ureido-ethyl acrylamide, 2-ureido-ethyl methacrylamide, and 1-[2-(3-alloxy-2-hydroxypropylamino)-ethyl]imidazolidin-2-one. The preferred ureido-containing monomer is 1-[2-(3-alloxy-2-hydroxypropylamino)ethyl]imidazolidin-2-one, commercially known as Sipomer WAM brand monomer and available from Alcolac. The ureido-containing monomers are generally used in a concentration sufficient to enhance the wet adhesion strength of the emulsion, e.g., from about 0.25 to about 1 weight percent of the polymer.

A seed is another optional ingredient present in the polymer. The seed acts as a locus for polymerization and generally has an average particle size of less than about 80 nm, and preferably within the range of about 25 to about 60 nm. Exemplary seeds are comprised of a surfactant and a monomer, e.g., alkenyl aromatic monomers, acrylate monomers, and mixtures thereof. Usually, styrene and/or butyl acrylate monomers are employed in manufacturing the seed.

The polymers of the present invention demonstrate an actual $T_g$ of about 30° to about 70° C., preferably about 40° to about 60° C., and most preferably about 45° to about 60° C. There are several ways of determining the actual $T_g$ of the polymers. For purposes of the present specification and claims, the actual $T_g$ is determined by differential scanning calorimetry (DSC).

Interestingly, some of the polymers possess a different calculated $T_g$. The calculated $T_g$ of each polymer is derived by multiplying the weight percent of each constituent monomer by the $T_g$ of a homopolymer made from that monomer and adding all the resulting numerical products. Typically, the calculated $T_g$ of polymers is between about 25° and about 60° C.

The emulsions of the present invention are made, for example, by a delayed addition polymerization process. Typically, the delay-addition polymerization process comprises forming a monomer mixture containing about 20 to about 40 weight percent soft monomer and about 60 to about 80 weight percent hard monomer. As hard monomer constituents, the monomer mixture specification comprises about 5 to about 20 weight percent acrylonitrile and about 1 to about 5 weight percent olefinic carboxylic acid monomer.

Water is added to a reactor and heated, generally to about 150° to about 190° F., while preferably purging the reactor with an inert gas, such as nitrogen, to remove substantially all oxygen from the reactor. A catalyst is then added to the reactor. Preferably, a locus for polymerization (e.g., a surfactant and/or a surfactant-containing seed) is added to the reactor before, simultaneously with, or after the catalyst addition to form a reactor charge. After the addition of the catalyst and locus for polymerization, the delay-addition of the monomer mixture is then commenced. The ensuing reaction forms the emulsion of the present invention. The addition of the monomer mixture typically takes up to about 3 hours. During the delay-addition of the monomer mixture, additional catalyst is typically also added to the reactor.

In an alternative synthesis procedure, a portion, for example up to about ½ of the monomer mixture, is added to the reactor at the beginning of the reaction along with the addition of the initial catalyst and/or seed and/or surfactant.

In order to stabilize the emulsion, toward the end of the monomer mixture addition, the pH of the emulsion is typically adjusted. Generally, the pH of the emulsion is adjusted to at least about 6, preferably to about 6 to about 10, and most preferably to about 6 to about 8. Adjusting the pH to within these ranges substantially neutralizes all olefinic carboxylic acid groups on the polymer.

Usually the pH of the emulsion is adjusted from about 30 minutes before to about 30 minutes after terminating the addition of the monomer mixture. Preferably, the pH adjustment occurs within about 15 minutes after terminating the monomer mixture addition.

After finishing the monomer mixture addition, further catalyst is commonly added while maintaining the emulsion at the elevated reaction temperature to ensure that substantially all of the monomers polymerize. The same catalyst can be used whenever one is employed. Exemplary catalysts include, but are not limited to, t-butyl hydroperoxide, sodium persulfate, hydrogen peroxide, and mixtures thereof.

The emulsion is allowed to cool to ambient or room temperature after all the monomer mixture and catalyst have been added. Usually, the pH of the cooled emulsion is adjusted, if necessary, to about 8 to about 10. Typically, a base is employed in each instance where the pH of the emulsion is adjusted. Exemplary bases are selected from the group consisting of amine-containing bases, hydroxide-containing bases, and mixtures thereof. Dimethylamine, diethylamine, aminopropanol, ammonium hydroxide, and sodium hydroxide are typical bases, with volatile bases being preferred, and ammonium hydroxide being the most preferred.

The polymerization process yields the polymeric emulsion of the present invention. The solids content of the emulsion is generally at least about 40 weight percent, preferably within the range of about 45 to about 60 weight percent, and more preferably within the range of about 45 to about 55 weight percent.

The emulsion is used as a binder in a waterbased varnish. A typical varnish comprises a coalescing aid, a defoamer, a biocide, and the binder. A rheology modifier, a mar-resistant agent (e.g., a wax emulsion), and a flattening agent (e.g., silica) are also sometimes used in water-based varnishes. Generally a varnish is clear and, in these instances, is usually devoid of a pigment or coloring agent. However, some varnishes are colored with a color-imparting agent, e.g., pigments, stains, and dyes. Coalescing aids, rheology modifiers, mar-resistant agents, flattening agents, color-imparting agents, defoamers, and biocides suitable for use in water-based varnishes are well known to those skilled in the art.

In use, the varnish is applied to at least a portion of a surface of a substrate. Upon drying, the emulsion forms a film or coating that is resistant to, inter alia, water, 50 wt % ethanol, and mild alkali. More particularly, the film produced by the emulsions of the present invention do not exhibit spotting or physical degradation upon visual inspection when exposed, at room temperature and for at least about 17 hours, to a cotton swab moistened with either water or 50 wt % ethanol or 1 wt % TSP. Accordingly, the emulsion of the instant invention is a suitable binder for use in water-based varnishes.

EXAMPLES

The following examples demonstrate the preparation of exemplary polymeric emulsions within the scope of the present invention as well as the resistance to water, 50% ethanol, and alkali exhibited by films formed with water-based varnishes employing these emulsions as their binder component. However, the invention is not limited to the examples, but is defined by the claims.

EXAMPLES 1-4

Preparation of Polymeric Emulsions

Monomer mixtures having the compositions set forth in the following Table I were prepared:

TABLE I

| Example | ST[a] | 2EHA[b] | MAA[c] | BA[d] | AN[e] | MMA[f] |
|---|---|---|---|---|---|---|
| 1 | 285 | — | 15 | 240 | 30 | — |
| 2 | 315 | 60 | 15 | 120 | 60 | — |
| 3 | 315 | 210 | 15 | — | 60 | 30 |
| 4 | 350 | 60 | 15 | 120 | 60 | — |

[a]ST denotes styrene.
[b]2EHA denotes 2-ethylhexyl acrylate.
[c]MAA denotes methacrylic acid.
[d]BA denotes butyl acrylate.
[e]AN denotes acrylonitrile.
[f]MMA denotes methyl methacrylate.

In each of Examples 1-4, water (about 550 g) was added to a reactor and heated while purging the reactor with nitrogen. When the water reached a temperature of about 180° F., the ingredients listed in Table II, infra, were individually added to the reactor.

TABLE II

| | Ingredients, g | |
|---|---|---|
| Example | Sodium Persulfate | 50S[g] | 30S[h] |
| 1 | 0.9 | 36 | — |
| 2 | 0.9 | — | 18 |
| 3 | 0.9 | — | 18 |
| 4 | 0.9 | 36 | — |

[g]50S denotes a 30 weight percent total solids emulsion containing a styrene/butyl acrylate (50:50 weight percent) seed having an average particle size of about 50 nm.
[h]30S denotes a 30 weight percent total solids emulsion containing a styrene seed having an average particle size of about 30 nm.

Next, the monomer mixture shown in the above Table I and a catalyst solution described in Table III were separately, but simultaneously, added to the contents of the reactor over a period of about 3 hours while maintaining the temperature within the reactor at about 185° F.

TABLE III

| | Ingredients, g | | |
|---|---|---|---|
| Example | Sodium Persulfate | Water | 2AI[i] |
| 1 | 0.9 | 27 | 3.3 |
| 2 | 0.9 | 27 | — |
| 3 | 0.9 | 27 | — |
| 4 | 0.9 | 27 | — |

[i]2AI denotes Dowfax 2A1 brand anionic surfactant (45% active).

In Examples 1-4, immediately after finishing the addition of the catalyst solution and the monomer mixture, a solution containing about 6 ml ammonium hydroxide and about 20 ml water was added to the emulsion. After the emulsion cooled to room temperature, a 10% ammonium hydroxide solution was added in a sufficient amount to raise the pH of the emulsion to about 8.5. The total solid content of the emulsions and the average particle size of the polymers (measured with a Nonsizer N4 brand particle sizer available from Coulter Electronics) are given in Table IV, infra.

TABLE IV

| Example | Particle Size, nm | Total Solids, wt. % |
|---|---|---|
| 1 | 177 | 48.6 |
| 2 | 113 | 50.1 |
| 3 | 125 | 49.9 |
| 4 | 178 | 51.0 |

The polymer component of the emulsion of Examples 2 and 3 had the actual and calculated $T_g$'s shown in Table V.

TABLE V

| Example | Actual $T_g$, °C. | Calculated $T_g$, °C. |
|---|---|---|
| 2 | 55 | 31 |
| 3 | 46 | 29 |

EXAMPLE 5

Preparation of Polymeric Emulsion

A monomer mixture and an aqueous solution were prepared. The monomer mixture comprised about 260 g styrene, about 270 g 2-ethylhexyl acrylate, about 12 g acrylic acid, and about 60 g acrylonitrile. The aqueous solution contained about 50 g water and about 6 g acrylamido glycolic acid.

Next, water (about 500 g) was added to a reactor and heated while purging the reactor with nitrogen. When the water reached a temperature of about 180° F., about 20.9 g sodium persulfate and about 18 g of a 30 weight percent total solids emulsion containing a styrene seed having an average particle size of about 30 nm were individually added to the reactor.

The monomer mixture and a catalyst solution comprising about 0.9 g sodium persulfate and about 27 g water were then separately added to the contents of the reactor over a period of about 3 hours while maintaining the temperature within the reactor at about 185° F. Immediately after finishing the addition of the catalyst solution and the monomer mixture, a solution containing about 10 ml ammonium hydroxide and about 20 ml water was added to the emulsion.

After the emulsion cooled to room temperature, a 10% ammonium hydroxide solution was added in a sufficient amount to raise the pH of the emulsion to about 8.6. The total solid content of the emulsion was about 49.0 weight percent and the average particle size of the polymer was about 122 nm.

EXAMPLE 6

Preparation of Polymeric Emulsion

A monomer mixture and a cross-linking solution were prepared. The monomer mixture comprised about 300 g styrene, about 224 g 2-ethylhexyl acrylate, about 60 g acrylonitrile, and about 12 g acrylic acid. The cross-linking solution contained about 50 g water and about 25 g N-methylol acrylamide.

Next, water (about 550 g) was added to a reactor and heated while purging the reactor with nitrogen. When the water reached a temperature of about 180° F., about 0.9 g sodium persulfate and about 18 g of a 30 weight percent total solids emulsion containing a styrene seed having an average particle size of about 30 nm were individually added to the reactor.

The monomer mixture and a catalyst solution comprising about 0.9 g sodium persulfate and about 27 g water were then separately added to the contents of the reactor over a period of about 3 hours while maintaining the temperature within the reactor at about 185° F. Immediately after finishing the addition of the catalyst solution and the monomer mixture, a solution containing about 6 ml ammonium hydroxide and about 20 ml water was added to the emulsion.

After the emulsion cooled to room temperature, a 10% ammonium hydroxide solution was added in a sufficient amount to raise the pH of the emulsion to about 8.5. The total solid content of the emulsion was about 47.0 weight percent and the average particle size of the polymer was about 121 nm.

EXAMPLES 7-12

Formulation of Varnishes

About 0.34 g Colloids 681F brand defoamer (available from Colloids, Inc.) was combined with a sufficient amount of one of the emulsions of Examples 1-6 to yield a composition containing about 106 g (at about 50 weight percent solids) of the respective emulsion. A premixture of butyl cellosolve (about 18.6 g) and sufficient water to reduce the viscosity of the resulting varnish to less than about 500 cps was added to the composition with stirring. Finally, about 5.6 g of Michem-LUBE 156 brand wax emulsion was added, while stirring, to the composition.

EXAMPLES 13-18

Resistance Tests

Oak panels were coated with the varnishes of Examples 7-12. The coating process entailed the step of coating a panel with a varnish, drying the coated panel at room temperature, and sanding the coated panel with fine sandpaper. This step was repeated two additional times with the sole modification that the coated panel was not sanded after the third drying procedure.

A plain cotton swab soaked with one of the three test liquids (i.e., water, 50 wt % aqueous ethanol, or 1 wt % aqueous TSP) was placed on the coated panel, covered with a glass dome-shaped lid to reduce evaporation, and allowed to sit there for about 17 hours at room temperature. After 17 hours, the wet cotton swab was removed and the coated panel was visually examined. The visual observations are noted in Table VI, infra.

TABLE VI

| Example | Varnish Containing Emulsion of | Water Test | 50% Ethanol Test | 1% TSP Test |
|---|---|---|---|---|
| 13 | Example 1 | OK[j] | Spot[k] | NT[l] |
| 14 | Example 2 | OK | OK | OK |
| 15 | Example 3 | OK | OK | OK |
| 16 | Example 4 | OK | Spot | OK |
| 17 | Example 5 | NT | OK | NT |
| 18 | Example 6 | OK | OK | OK |

[j]OK denotes that coating did not exhibit any discoloration or physical degradation when the test swab was removed.
[k]Spot denotes that the coating appeared slightly whitish when the test swab was removed but returned to a clear color after a period of time and did not exhibit any physical degradation.
[l]NT denotes not tested.

The data provided in Table VI indicate that the water-based varnishes of the present invention (prepared using the above described polymeric emulsions as their binder component) form coatings that are resistant to water, 50% ethanol, and alkali.

Although the present invention has been described inconsiderable detail with reference to certain preferred versions thereof, other versions are possible. For example, the varnishes can include one or more ingredients that enhance other film and/or varnish properties. Therefore, the spirit and scope of the appended claims should not necessarily be limited to the description of the preferred embodiments contained herein.

I claim:

1. A polymeric emulsion comprising (i) a polymer (ii) water, and (iii) a surfactant-containing locus for polymerization, wherein the emulsion comprises less than about 1 weight percent surfactant and at least about 40 percent total solids, and the polymer has an average particle size of less than about 150 nm and a calculated $T_g$ of about 25° to about 60° C. and comprises:

(a) about 20 to about 40 weight percent ethylhexyl acrylate;

(b) about 60 to about 80 weight percent of a plurality of hard monomers, each of whose homopolymers has a $T_g$ of greater than about 30° C., wherein acrylonitrile and an olefinic carboxylic acid monomer constitute a portion of the hard monomer component of the polymer, the polymer comprising about 5 to about 20 weight percent acrylonitrile and 1 to about 5 weight percent olefinic carboxylic acid monomer; and (c) about 0.2 to about 5 weight percent of a copolymerizable cross-linking agent selected from the group consisting of N-methylol acrylamide, N-methylol methacrylamide, diacrylates, dimethacrylates, triallyl cyanurate, diallyl maleate, and mixtures thereof.

2. The emulsion of claim 1 comprising less than about 0.5 weight percent surfactant.

3. The emulsion of claim 1 wherein the polymer comprises about 25 to about 35 weight percent ethylhexyl acrylate and about 65 to about 75 weight percent hard monomer.

4. The emulsion of claim 1 wherein the polymer has an actual $T_g$ of about 30° to about 70° C.

5. The emulsion of claim 1 wherein the polymer has an actual $T_g$ of about 40° to about 60° C.

6. The emulsion of claim 1 wherein the polymer has an average particle size of about 100 to about 150 nm.

7. The emulsion of claim 1 wherein the hard monomer is selected from the group consisting of olefinic carboxylic acid monom vinyl halide, acrylonitrile, methacrylamide, alkenyl aromatic monomers, non-functional methacrylic monomers, and mixtures thereof.

8. The emulsion of claim 1 wherein the hard monomer is an alkenyl aromatic monomer having the formula

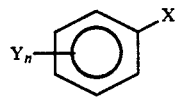

wherein X is an aliphatic radical containing at least one alkenyl bond, Y is a substituent on the aromatic ring, and n is an integer from 0 to 5.

9. The emulsion of claim 8 wherein the alkenyl aromatic monomer is selected from the group consisting of styrene, p-methyl styrene, methyl styrene, o,p-dimethyl styrene, o,p-diethyl styrene, p-chlorostyrene, isopropyl styrene, t-butyl styrene, o-methyl-p-isopropyl styrene, o,p-dichlorostyrene, and mixtures thereof.

10. The emulsion of claim 1 wherein the hard monomer is styrene.

11. The emulsion of claim 1 wherein the olefinic carboxylic acid monomer is selected from the group consisting of mono- and di-olefinic carboxylic acids, and mixtures thereof.

12. The emulsion of claim 1 wherein the olefinic carboxylic acid monomer selected from the group consisting of acrylic acid, methacrylic acid, itaconic acid, acrylamido glycolic acid, and mixtures thereof.

13. The emulsion of claim 1 wherein the olefinic carboxylic acid monomer is methacrylic acid.

14. The emulsion of claim 1 wherein the polymer comprises about 2 to about 4 weight percent olefinic carboxylic acid monomer.

15. The emulsion of claim 1 wherein the polymer comprises about 8 to about 15 weight percent acrylonitrile.

16. The emulsion of claim 1 wherein the polymer comprises about 1 to about 3 weight percent cross-linking monomer.

17. The emulsion of claim 1 wherein the emulsion comprises less than about 0.5 weight percent surfactant, and the polymer comprises about 25 to about 35 weight percent ethylhexyl acrylate and about 65 to about 75 weight percent hard monomer, and has an actual $T_g$ of about 30° to about 70° C.; the hard monomer is selected from the group consisting of vinyl halide, acrylonitrile, methacrylamide, alkenyl aromatic monomers, non-functional methacrylic monomers, olefinic carboxylic acid monomers, and mixtures thereof, the polymer comprising about 8 to about 15 weight percent acrylonitrile and about 2 to about 4 weight percent olefinic carboxylic acid monomer; and the olefinic carboxylic acid monomer is selected from the group consisting of acrylic acid, methacrylic acid, itaconic acid, acrylamide glycolic acid, and mixtures thereof.

18. The emulsion of claim 1 wherein the surfactant-containing locus for polymerization is a seed.

19. The emulsion of claim 1 wherein the surfactant-containing locus for polymerization is a seed having an average particle size of less than about 80 nm.

20. The emulsion of claim 1 wherein the surfactant-containing locus for polymerization is a seed having an average particle size of about 25 to about 60 nm.

21. The emulsion of claim 1 wherein the surfactant-containing locus for polymerization is a seed that comprises a monomer selected from the group consisting of alkenyl aromatic monomers, acrylate monomers, and mixtures thereof.

22. The emulsion of claim 1 comprising about 45 to about 55 weight percent total solids.

23. A polymeric emulsion comprising (i) a polymer (ii) water, and (iii) a surfactant-containing locus for polymerization, wherein the emulsion, has a surface tension greater than about 45 dynes/cm and comprises less than about 1 weight percent surfactant and at least about 40 percent total solids, and the polymer has an actual $T_g$ of about 30° to about 70° C. and an average particle size of less than about 150 nm and comprises:
   (a) about 20 to about 40 weight percent ethylhexyl acrylate;
   (b) about 60 to about 80 weight percent of a plurality of hard monomers, each of whose homopolymers has a $T_g$ of greater than about 30° C., wherein acrylonitrile and an olefinic carboxylic acid monomer constitute a portion of the hard monomer component of the polymer, the polymer comprising about 5 to about 20 weight percent acrylonitrile and 1 to about 5 weight percent olefinic carboxylic acid monomer; and
   (c) about 0.2 to about 5 weight percent of a copolymerizable cross-linking agent selected from the group consisting of diacrylates, dimethacrylates, triallyl ovanurate, diallyl maleate, and mixtures thereof.

24. The emulsion of claim 23 wherein the polymer comprises about 1 to about 3 weight percent copolymerizable cross-linking agent.

* * * * *